April 21, 1970 H. SANDY ET AL 3,507,477
ROTATING BOLLARDS
Filed July 3, 1967

INVENTORS
Ivan Krogstad
Harry Sandy
BY
Pennie, Edmonds, Morton, Taylor & Adams
ATTORNEYS United States Patent Office 3,507,477
Patented Apr. 21, 1970

3,507,477
ROTATING BOLLARDS
Harry Sandøy and Ivar Krogstad, Arendal, Norway, assignors to Aksjeselskapet Pusnes Mekaniske Verksted, Arendal, Norway, a corporation of Norway
Filed July 3, 1967, Ser. No. 650,683
Claims priority, application Norway, July 5, 1966, 163,786
Int. Cl. B66d 1/50; F16d 65/24
U.S. Cl. 254—150                9 Claims

ABSTRACT OF THE DISCLOSURE

The invention relates to an improvement in rotating bollards wherein the bollard members are adapted to rotate in one direction and are prevented from rotating in the other direction by means of a ratchet mechanism which cooperates with a brake adapted to slip when subjected to undue loads.

Figure 1:
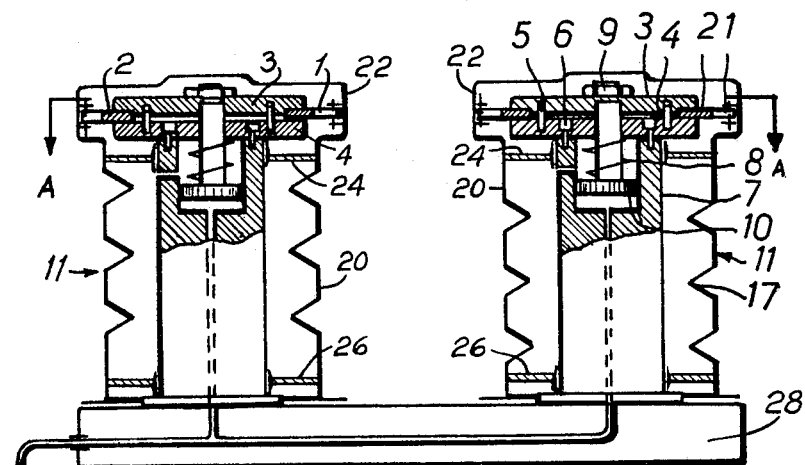

The release of the hawser has an inherent risk and to avoid this it is according to the invention provided for that the ratchet and brake mechanism is releasable for free rotation also in the other direction. This allows the bollard to rotate in a direction such as to allow the hawser to be payed out, thereby reducing the inherent risk by the release of the hawser.

---

The present invention relates to an improvement in rotating bollards, for instance of the type described in Norweigian Patent No. 107,372 wherein the bollard members are adapted to rotate in one direction and are prevented from rotating in the other direction by means of a ratchet mechanism which cooperates with a brake. The brake is adapted so as to slip when subjected to undue loads. The advantage of such bollards is that it is possible to reduce the number of crew members necessary to man a mooring or hauling winch since the hawser is laid in the usual figure eights around the bollard and led to the winch. The rotating bollard members allow the awser to slip through the bollard with a minimum of friction when said hawser is hauled in by the winch. When the hawser is sufficiently taut it may be released from the winch which is then used for other purposes, while the hawser, which lies in figures of eight on the bollard, is held fast in known manner, the bollard members being unable to rotate, and thus pay out the hawser, unless subjected to unduly great loads.

Accidents occur very easily when the hawser, which may be a steel rope or a fibre rope, is to be released manually, and, since the bollards of the type described in Norweigian Patent No. 107,372 allow a more efficient utilization of the bollard it being easier to make the hawser or rope sufficiently taut, the release of the same, when being payed out, is correspondingly more dangerous.

The object of the present invention is primarily to reduce the said risk factors caused by releasing the bollard members so that they are able to rotate in a direction such as to allow the hawser or rope to be payed out.

The dimensioning of such bollards is based on the pulling power of the winch multiplied by the number of rope portions pulling the bollard members toward one another. If there are many loops, the dimensions of the bollard are unreasonably great, and, at the same time, great loss of friction occurs. It is therefore desirable to reduce the number of loops to the acceptable minimum. The number of loops can be reduced if the rotating bollard members are provided with annular grooves, preferably of V-shaped cross section, for the rope, so that, in addition to larger bearing surfaces, a wedge effect which increases the friction force on the rope, is achieved. The grooves are, moreover, a guarantee against the overloading of the bollard if more loops are laid around the bollard than was intended for its dimension.

Grooves in the bollard members provide a further advantage in that they prevent the rope from climbing the rotating bollard members. The line of contact around the bollard members when these are smooth describes a helical line, and when the bollard members rotate, the rope turns around the portion of the bollard where the rope runs off at the actual direction of rotation. The rope may then climb over the flanges if these are low.

In accordance with the invention, the above said disadvantage is overcome in that the ratchet and brake mechanism is releasable for free rotation also in the said second direction, and the release means may be effected in any suitable manner, it is preferred to effect the ratchet and brake mechanism in a ram, however, which release the brake mechanism when supplied with hydraulic drive medium.

In accordance with the invention, the increase of friction forces between the rope and the bollard members is achieved by constructing the rotating bollard members with encircling grooves so as to provide greater bearing surface for the rope against the bollard, and guide the rope so as to prevent it from climbing when the bollard is rotated.

Figure 2:
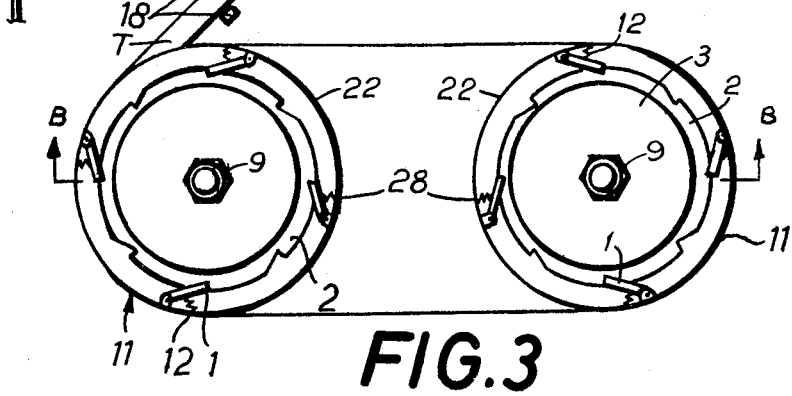
Figure 3:
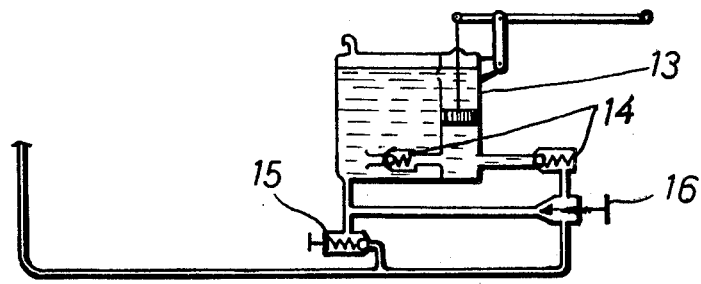

Other features and details of the invention are explained in the following description with reference to the drawing where:

FIG. 1 is a vertical partial sectional view through a pair of bollards taken on the line B—B of FIG. 2, the bollards being rotatable and having disc brakes at the top thereof, FIG. 2 is a plan view of the bollard members taken on the line A—A of FIG. 1 with the tops of the bollards above the upper brake discs removed, and FIG. 3 is a diagrammatic view of a pump control means connected by piping to the bollard members shown in FIG. 1.

Spring loaded bollards 11 provided with pawls 1 pivoted on the inner periphery of the casing cooperate on FIGS. 1 and 2 with a ratchet wheel 2 which is clamped between the brake discs 3 and 4. The discs 3 are secured against rotation with respect to the discs 4 by means of pins 5, and the discs 4 are screwed fast to the stationary axles 7 with bolts 6. The friction force between the discs 3 and 4 and the ratchet wheel 2 is produced by the spring 8 which may be adjusted by means of nuts 9 and the slip factor of the brake is thereby regulated so that when the tension in the cable is in excess of a predetermined value, the bollard members may be turned against the action of the friction in the brake mechanism. The adjusting nut 9 of each bollard member, as shown in FIG. 1, is threaded onto the upper end of a piston rod extending through the spring 8 and attached to the piston 10. The piston rod extends through the brake disc 3 and the nut 9 bears directly on the upper surface of this disc. The spring 8, as shown in FIG. 1, is compressed between the bottom of the brake disc 4 and the upper surface of the piston 10.

In order to pay out the rope or hawser without the necessity of manually releasing the hawser from the bollard, the tension of which may be several tons, in accordance with the invention, the brake is adapted to slip, by separating the discs 3 and 4. This separation may be effected in any number of different ways, e.g. mechanically, electromagnetically, pneumatically, or hydraulically, and it is this latter which is the preferred embodiment. For this reason FIG. 3 shows a piston pump 13 which feeds hydraulic fluid to the lower portion of a cylinder in each of the bollard members 11 below the piston 10 therein. The hydraulic pressure from the pump will separate the discs 3, 4 against the action of the spring 8, and the bollard can then rotate in such direction that the hawser T, shown by an arrow point on FIG. 2, can be payed out. The ratchet wheel 2 then rotates freely between the discs 3 and 4, with the bollard member 11.

The pump 13 may be constructed according to known principles with, amongst other things, two check valves 14, a safety valve 15, and a pressure release valve 16. The pressure release valve is opened when it is desired to release the pressure built up by the pump in order to reconnect the brake discs 3 and 4 with the ratchet wheel 2.

The rotatable bollard members 11 are further provided with grooves 17 which are of angular or V-shape cross section so as to provide clamp effect and thereby improved friction against the rope. In order further to improve the friction factor of the rope, in that the rope T is also tightened in its last encircling of the bollard before being guided onto the winch, a set of chucks 18 are mounted so as to press against one another around the rope. Pressure is obtained by means of a spring 19.

The rotatable bollard members 11 shown diagrammatically in section in FIG. 1 comprises a lower portion 20 provided with V-shaped grooves 17, and a somewhat enlarged upper portion 22 carrying the pawls 1 biased by springs 12. The bollard members, as illustrated in FIG. 1, each comprises a hollow casing provided with rigid upper and lower bearing rings 24, 26 surrounding and rotatably engaging the stationary axle 7, mounted on a base member 28. The hollow casings of the bollard members may be fabricated by securing together suitably shaped steel plates, for example ½" or more thick.

The example shown serves merely to illustrate the invention and forms no limitation of the protection afforded since other embodiments may be envisioned which fall within the scope of the invention.

Having described our invention, we claim:

1. In a rotatable bollard member adapted to be wrapped with a hawser and provided with a one-way effect ratchet mechanism which allows free rotation of the bollard member in one direction only, and a cooperating brake mechanism having a resilient loading means and which locks the bollard member against rotation in the other direction until the torque asserted on the bollard member by the hawser exceeds the loading value for which the loading means of the brake mechanism is set, the improvement wherein power means is provided for releasing the brake mechanism permitting free rotation of the bollard member in said other direction and the pay-out of the hawser, said releasing means including manually operable actuating means therefor, which when its operation is stopped restores the braking mechanism to the control of the loading means and restores the set value of its loading means on the braking mechanism.

2. A rotatable bollard member as claimed in claim 1, wherein the ratchet and brake mechanism are interconnected and cooperate with each other.

3. A rotatable bollard member as claimed in claim 2, wherein the brake mechanism is stationary and is arranged to engage the ratchet mechanism.

4. A rotatable bollard member as claimed in claim 3, wherein the brake mechanism comprises a pair of discs and the ratchet mechanism comprises a ratchet wheel, a portion of which is located between said brake discs and clampable thereby.

5. In a rotatable bollard member as claimed in claim 1, wherein the portion of said member for engagement by a hawser comprises means defining a plurality of spaced annular exterior grooves adapted to provide increased bearing surface for the hawser and precent climbing of the hawser when the bollard is rotated.

6. A rotatable bollard member as claimed in claim 5, wherein said grooves are V-shaped in cross section.

7. A rotatable bollard member as claimed in claim 1, including a pair of chucks at the outlet of the hawser from the rotatable bollard member for guiding the hawser and increasing the frictional pull on the hawser.

8. A rotatable bollard member as claimed in claim 1, wherein the brake mechanism is spring loaded for providing the desired resistance by the brake mechanism.

9. A rotatable bollard member as claimed in claim 8, including hydraulic means for compressing the spring and releasing the brake mechanism.

References Cited

UNITED STATES PATENTS

| | | | |
|---|---|---|---|
| 2,742,261 | 4/1956 | Arnold | 254—150 |
| 2,776,096 | 1/1957 | Isbell | 254—175.7 |
| 3,270,705 | 9/1966 | Roeggen | 114—218 |
| 755,953 | 3/1904 | Smith | 254—150 |
| 3,244,405 | 4/1966 | Hanning | 188—170 |
| 3,319,492 | 5/1967 | Magnuson | 254—150 |

HARVEY C. HORNSBY, Primary Examiner

U.S. Cl. X.R.

114—218; 188—82.3, 170